May 27, 1941.  A. A. EWALD  2,243,623
FIBER CUTTER
Filed Aug. 13, 1938  3 Sheets-Sheet 1

INVENTOR.
ARNO A. EWALD
BY
Wheeler Wheeler + Wheeler
ATTORNEYS

May 27, 1941.  A. A. EWALD  2,243,623
FIBER CUTTER
Filed Aug. 13, 1938   3 Sheets-Sheet 2

INVENTOR.
ARNO A. EWALD

Wheeler, Wheeler & Wheeler
ATTORNEYS

May 27, 1941.  A. A. EWALD  2,243,623
FIBER CUTTER
Filed Aug. 13, 1938  3 Sheets-Sheet 3

INVENTOR.
ARNO A. EWALD
BY
Wheeler, Wheeler & Wheeler
ATTORNEYS

Patented May 27, 1941

2,243,623

UNITED STATES PATENT OFFICE 2,243,623

FIBER CUTTER

Arno A. Ewald, Oakfield, Wis., assignor to Romort Manufacturing Company, Oakfield, Wis., a corporation of Wisconsin Application August 13, 1938, Serial No. 224,706

17 Claims. (Cl. 17—25)

My invention relates to improvements in fiber cutters for meats and other materials.

A general object of my invention is to provide improved means to facilitate cross cutting steaks and other slab-like pieces of meat preparatory to frying or cooking, thereby severing the cartilage and elongated fibers in a plurality of directions, and making the subsequently cooked servings easy to cut with an ordinary table knife and imparting to the meat the characteristic of tenderness and severability possessed by the flesh of young animals.

More particularly, objects are to provide a machine having a battery of removable cutter blades which can be reciprocated at high speed, and readily oscillated between cutting operations to cause the blades to cut and cross cut the fibers in successive strokes; to provide means whereby the blades are adequately protected from contamination; to provide improved means for automatically lifting the blades and stripping the fibrous material therefrom; to provide means whereby all of the parts can be separated, cleansed, and reassembled with such facility that requirements imposed by inspectors, for frequent inspection and cleansing operations, will not be regarded as unreasonable; to provide operating mechanism in which the mechanical advantage increases during the final portion of each cutting stroke in such a manner that the machine can be operated with minimum expenditure of power; and to provide means whereby the cutting operation may be progressively advanced along successive slabs of meat while the cutters are being reciprocated.

A further object of my invention is to provide means whereby the blade carrying unit may be separated from the operating member as a unit, including the stripper plate and blade retracting springs, and placed in a refrigerator or other storage chamber between periods of operation, such unit being quickly returned to operating position whenever occasion may require.

In the drawings.

Like parts are identified by the same reference characters throughout the several views.

Figures 1, 9:
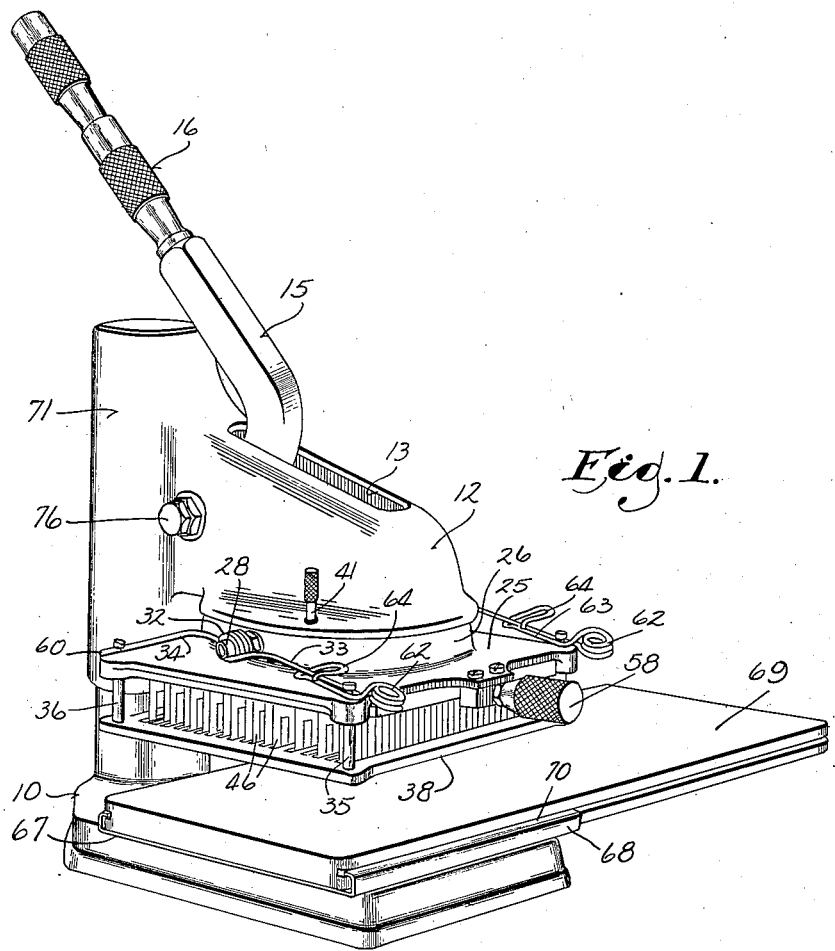
Figure 1 is a perspective view of my improved fiber cutting machine as it appears when assembled and ready for operation.
Figure 9 is a sectional view, drawn to line 9—9 of Figure 2.
Figure 2:
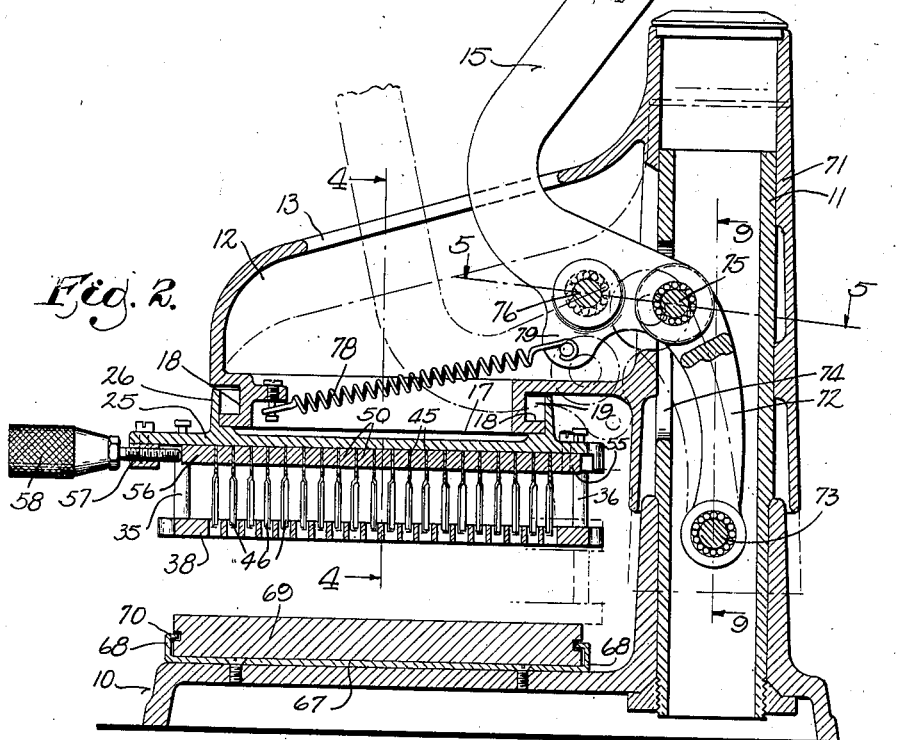
Figure 2 is a vertical section drawn to a plane extending through the central portion of the machine, from front to rear.
Figure 3:
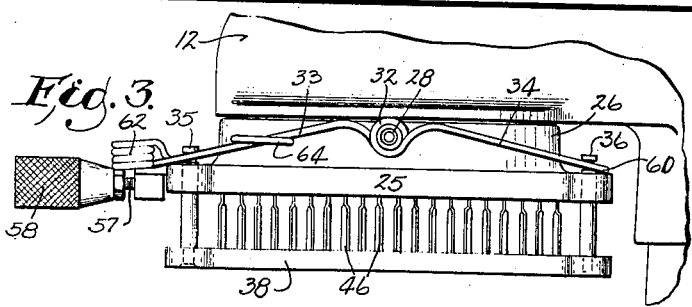
Figure 3 is a detail view of the blade carrier in side elevation, a fragment of the supporting frame or housing being also illustrated.

In Figures 1 and 2 it will be observed that my improved machine has a base 10 provided with a raised housing, which includes a hollow column or tubular standard 11 and over the upper end of which a cap-like slide 71 is fitted and provided with a forwardly projecting hollow arm 12, generally circular in form along its lower margin, and with its top portion provided with a slot 13 through which power may be applied by means of a lever 15.

Preferably the lever 15 will be manually operated by means of a handle 16, although the lever may serve to transmit motion from any convenient source of power. The lower or arcuate margin 17 of the arm is preferably provided with a channel-shaped skirting ring 18, as best shown in Figure 2, and from this ring a blade carrier is suspended. This blade carrier will now be described.

The blade carrier has a top plate 25, provided with an upstanding circular flange 26, concentric with the ring 18, and normally concealing the ring channel 19. At each side of the machine a stud bolt 28 extends through a hole in the flange 26, with the head 29 of the bolt in the channel 19. Exterior nuts 31 clamp the respective bolt heads 29 to the flange 26, and radially, beyond the nut, the bolt has a stud-like unthreaded extension over which may be slipped the coil 32 of a blade carrier lifting spring having forwardly and rearwardly projecting arms 33 and 34, normally detachably engaged in annular channels in the upper end portions of stripper posts 35 and 36. These stripper posts have their lower ends connected with a slotted stripper plate 38, which normally constitutes the bottom of the blade carrier, because the springs and posts tend to hold it in that position below a set of blades hereinafter described.

The blade carrier is thus normally suspended from the ring 18 and may be swung or oscillated relatively, with the bolt heads riding upon the lower flange of the channel ring. A fixed stop 40 engages one of the bolt heads 29 to limit the oscillation of the carrier in one direction, and a removable stop post 41 is normally used to limit its oscillation in the other direction. The stop post normally extends through a notch 43 in the lower flange of the ring 18, whereby, when the post 41 is withdrawn, the carrier may be additionally oscillated to allow the bolt heads 29 to drop through the notches 43 for release of the carrier from its supporting ring.

The blades and blade holders will not be described.

Figures 6, 7, 8:
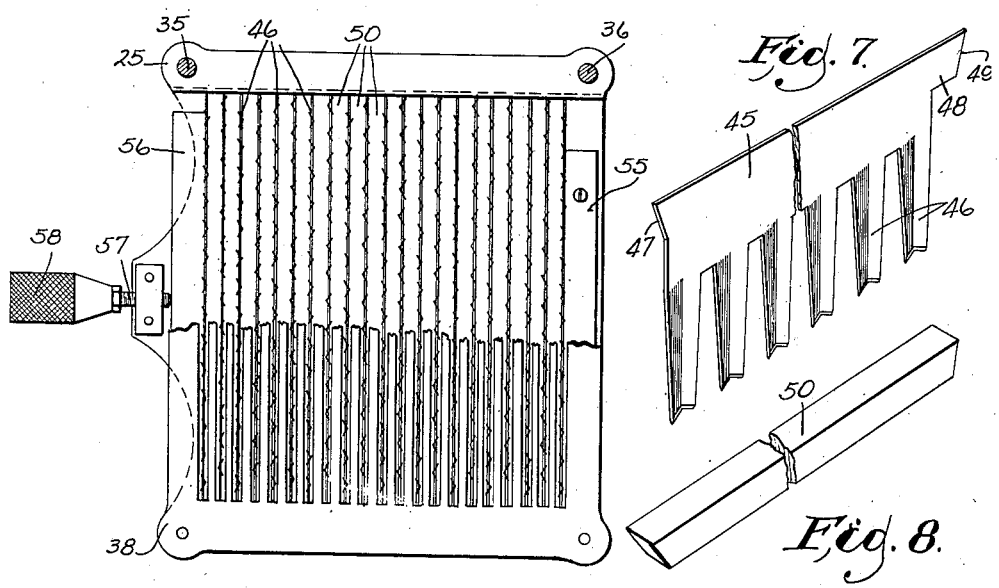
Figure 6 is a view of the carrier unit as seen from the under side, with portions of the stripper plate broken away.
Figure 7 is a perspective view of one of the blades, with a central portion broken away.
Figure 8 is a similar view of one of the blade spacers.

Each blade (Figure 7) comprises a sheet metal plate, cut or struck up to form a back bar 45 and a set of cutter elements or teeth 46, each of which is arcuate or V-shaped in cross section.

Figure 4:
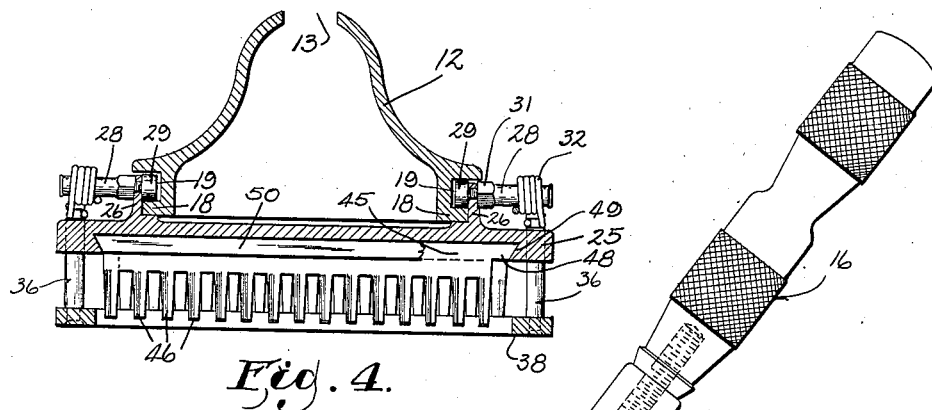
Figure 4 is a sectional view, drawn to line 4—4 of Figure 2.

At one end, the back bar has an oblique or dove-tail margin 47, close to the last tooth in the series. At the other end the back bar has an extension 48 terminating in a similar oblique margin 49, which serves as the complementary portion of the dove-tail. A dove-tailed channel in the under surface of the carrier plate 25 (Figure 4), receives the back bars of a set of these blades, and also receives spacing bars 50 (Figures 2, 4 and 8) to hold the blades in spaced relation to each other. By reversing each alternate blade, end for end, the cutter elements of the successive blades are staggered and faced in opposition directions.

All of the blades, with their associated back bars, may be clamped against the rear wall 55 of the channel (Figure 2), by means of a removable clamping bar 56 which may be inserted in the forward end of the dove-tailed channel and actuated to clamping position by a screw 57 connected with a handle 58. This handle is also utilized to oscillate the carrier upon its supporting channel ring 18.

Figure 5:
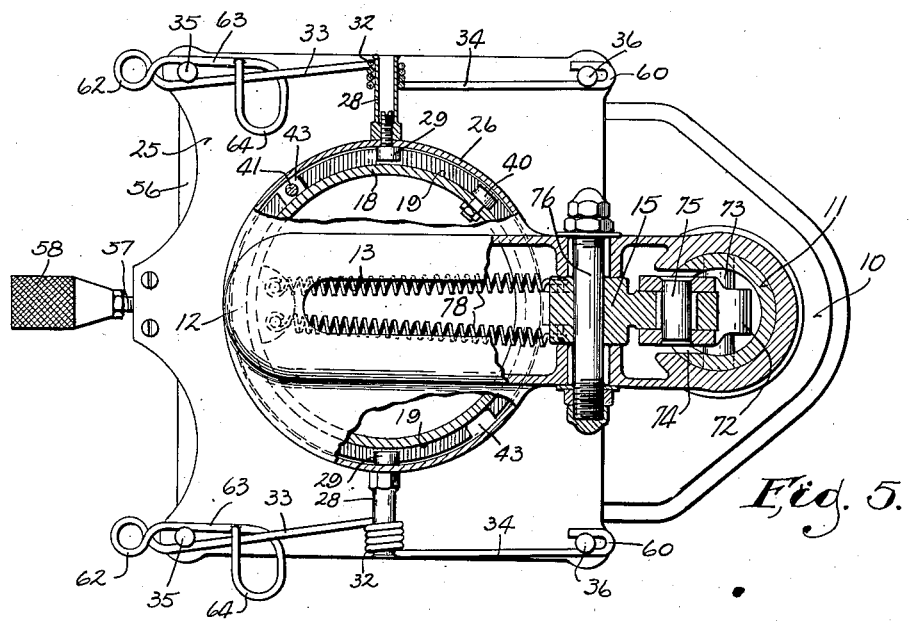
Figure 5 is a plan view, partly in section, on line 5—5 of Figure 2, and with portions of the carrier additionally broken away.

It has been stated that the stripper plate 38 is normally supported from the carrier by posts 35 and 36 and associated springs which have a central coil 32 engaged with the stud bolts 28. In Figure 5 it will be observed that the spring arm 34 has a hook-shaped extremity 60 to engage underneath the head of the post 36. The other arm 33 of the spring has an end coil 62 from which an arm 63 extends inwardly along the arm 33 and is provided with a loop 64 which is adapted to serve as a handle to facilitate removal of the spring.

By pressing upon the handle 64 in a direction to separate the arms 63 and 33, they may be withdrawn from their engagement with the associated post 35, thereby permitting withdrawal of the hook 60 from the rear post 36.

When the carrier has been released from its supporting ring 18 and the spring arms 33 and 34 released from the posts 35 and 36, the stripper, with its associated post, may be withdrawn from the carrier, leaving all the blades exposed. Thereupon rotation of the handle 58 to retract the screw 57 will allow the clamping bar 56 to be removed, followed by a removal of all of the blades and their spacing bars 50. All of the parts may thus be quickly separated and separately cleansed. If blades are damaged they may be removed and other blades substituted. All of the blades being alike, surplus blades may be provided and substitutions made by inexperienced persons whenever required.

The base 10 of the machine will preferably be provided with a table plate 67 having upstanding guide flanges 68 between which a slide 69 is mounted. The slide will preferably be provided with channels along its front and rear margins, and the flanges 68 may be inturned, as indicated at 70, to engage in these channels. The slide 69 may serve as a traveling table upon which a series of steaks, or other material to be slitted, may be mounted and moved successively underneath the blades, the blades and stripper bar being normally supported in a raised position above the table slide 69, as illustrated in Figures 1 and 2. The operating mechanism will now be described.

The hollow arm 12 has its tubular or cap-like slide 71 telescoped over the upper end of the post or column 11, upon which it slides vertically. A fulcrum bar 72 has its lower end pivoted to the post 11 at 73. Its upper end curves forwardly into a slot 74 in the front side of the column 11, where it is connected with the lever 15 by a fulcrum pin 75, said lever being pivoted to the hollow arm or housing 12 at 76. When the handle 16 is swung forwardly the pivot pin 76 tends to travel a circular path about the fulcrum pin 75, thereby forcing the arm 12 downwardly, the post or column 11 serving as a guide. The column guides the arm 12 along a straight line, but as the pivot pin 76 moves downwardly below the fulcrum pin 75 the latter is drawn forwardly by the short arm of the lever, this movement being permitted by the swinging fulcrum bar 72. The mechanical advantage increases as the pin 76 approaches a vertical plane through the fulcrum pin 75, whereby, when the points of the cutter elements enter the meat or other material they may be forced to penetrate with increasing power. When the handle is released it is restore to its normal position, as shown in Figures 1 and 2, by means of a set of springs 78 which connect the portion 79 of the lever with the front side of the ring 18. These springs urge the short arm 79 of the lever forwardly to the position illustrated in Figure 2. This causes the lever to swing upwardly and rearwardly upon its floating fulcrum 75 to lift the slide 71 and housing arm 12. It will, of course, be understood that when the lever 15 is drawn forwardly for a cutting operation the fulcrum bar 72 is also drawn forwardly through the slot 74.

During the final forward movement of the lever 15 the stripper plate 38 is brought into contact with the material to be cut, and the cutter elements of the respective blades are forced through the stripper plate slots into the material. During this movement the posts 35 and 36 are driven upwardly through the carrier top plate 25 against the pressure of the spring arms 33 and 34.

During the reverse movement of the lever, these spring arms return the stripper plate to its normal position, and the springs 78 lift the housing arm 12 and the carrier to the raised position in which these parts are illustrated in Figure 2. While in the raised position, the carrier may be rotatively adjusted by means of the handle 58.

In operation, the handles 16 and 58 may be oscillated in alternation to reciprocate the carrier vertically, and oscillate it horizontally in the intervals of blade retraction from the material.

It will be observed, in Figure 2, that the ring 18 is received within the cup-shaped top of the carrier plate. Therefore the operating parts are completely housed, with no opportunity for lubricant to reach the carrier.

Upon completion of any given set of cutting operations, withdrawal of the stop pin 41 permits removal of the carrier and stripper plate assembly without disturbing that assembly. The entire carrier unit may be placed in a refrigerator without separating and cleansing the parts if it is to be again used after a brief interval. But whenever cleansing is required the stripper plate may be disengaged from its springs and all of the blades removed and cleansed as above explained.

The arm-like housing 12, with its telescoping column section, operating lever, and the carrier has a total weight of about twenty-five pounds. When the inertia of this unit is overcome by a quick initial movement of the handle, the momentum will completely overcome the tension of the springs 78, and the blades may be forced entirely through the slab of meat on the table with the action of a heavy cleaver.

When the slide 12 is in the position illustrated in Figure 2 the pivot pin 76 will preferably be a little above the level of the fulcrum pin 75. Therefore the effective length of the short arm of the lever remains nearly the same until the pin 76 has moved to a substantial distance below the level of the fulcrum axis, and in the meantime the lever will have traversed a considerable portion of its downwardly swinging stroke and the blades will have been brought approximately into cutting position.

The bearing surfaces of the guide 11 and slide 71 are smooth, and as soon as the upper portion of the handle moves across a vertical plane through the pivot pin 76 its weight is added to that of the slide and the arm 12, whereupon the resistance imposed by the springs 78 will be overcome and the slide will tend to move downwardly with accelerating speed, no other resistance being encountered until the blades enter the material to be cut.

The handle has approximately a 16 inch stroke, and preferably has a weight of about three pounds. Therefore the slide and carrier unit will acquire considerable momentum, although they have a vertical movement of only about 2½ inches. Due to this momentum the blades will be initially driven into the material with what may be aptly termed a hammer blow, and if this does not cause them to penetrate the material the lever will then be in a position to be manually actuated with increasing mechanical advantage as its fulcrum approaches a vertical plane through the lever pivot. For these reasons severance of the fiber may be accomplished with minimum manual effort, and on the return stroke the springs 78 aid in lifting the parts and eliminate all manual effort during the final portion of the stroke if allowed to continue until the parts reach their normal elevated position of rest.

In fact, the tension of the springs 78 may merely assist in lifting the parts to the normal raised position, or may be merely sufficient to hold the parts in the raised position, with the handle swung backwardly far enough to assist the springs, or at least to substantially relieve them of the handle weight.

I claim:

1. In a machine of the described class, the combination with a slide supporting column, a slide on the column, a hollow carrier supporting arm having a depending channelled skirting ring, an oscillatory blade carrier suspended from the skirting ring, a set of blades detachably mounted in the carrier and provided with depending cutter elements, means for reciprocating the hollow arm, and a handle connected with the carrier to oscillate it on the skirting ring, said skirting ring having stops to normally limit oscillation of the carrier thereon and one of the stops being removable to permit additional oscillation of the carrier to a position of release from the ring.

2. In a machine of the described class, the combination with a slide freely movable supporting column, a slide on the column, including a hollow carrier supporting arm having a depending channelled skirting ring, an oscillatory blade carrier suspended from the skirting ring, a set of blades detachably mounted in the carrier and provided with depending cutter elements, resilient means for normally holding the slide in a raised position, and an operating lever having floating fulcrum connection with the column and a pivotal connection with the carrier supporting arm of the slide in proximity to the floating fulcrum and in a position to swing downwardly about the fulcrum when the lever is actuated to depress the slide and carrier, whereby the mechanical advantage of the lever progressively increases during said downward movement of the carrier.

3. In a machine of the described class, the combination with a slide supporting column, a slide on the column, a hollow carrier supporting arm having a depending channelled skirting ring, an oscillatory blade carrier suspended from the skirting ring, a set of blades detachably mounted in the carrier and provided with depending cutter elements, means for reciprocating the hollow arm, and a handle connected with the carrier to oscillate it on the skirting ring, said blade carrier having blades, spacing bars, clamping means and a resiliently connected stripping plate, said carrier and associated parts being freely removable from the ring as a unitary assembly when in one position of adjustment, and a displaceable stop normally holding the carrier from oscillation to position for such release and removal.

4. In a machine of the described class, the combination with a slide supporting column, a slide on the column, including a hollow carrier supporting arm having a depending channelled skirting ring, an oscillatory blade carrier suspended from the skirting ring, a set of blades detachably mounted in the carrier and provided with depending cutter elements, said skirting ring being of a sufficient diameter to distribute the pressure to all parts of the blades in proportion to the resistance encountered, means for reciprocating the hollow arm, and a handle connected with the carrier to oscillate it on the skirting ring, said blade carrier having blades, spacing bars, clamping means and a resiliently connected stripping plate, assembled as a unit removable from the ring as a unitary assembly when rotated in an abnormal position of adjustment, said blades, spacing bars, clamping means and stripping plate being releasable from the carrier and from each other with or without removal of the carrier from the ring.

5. In a machine of the described class, a blade carrier assembly comprising the combination of a carrier actuating arm provided with a depending ring having a radially projecting flange, a carrier top plate having an upwardly projecting circular flange concentric with said radial flange, and provided with hanger elements adapted for normal oscillation on the radial flange and releasable therefrom in positions of extreme oscillation, a set of blades and spacing bars adapted to be clamped to the under surface of the top plate, blade clamping devices, and a slotted stripper plate normally resiliently connected with the top plate with the blades in registry with its slots.

6. In a machine of the described class, a blade carrier assembly comprising the combination of a top plate provided with a circular upstanding flange and hanger elements adapted to releasably engage a circular support, a set of blades and spacing bars adapted to be clamped to the under surface of the top plate, blade clamping devices, and a slotted stripper plate normally resiliently connected with the top plate with the blades in registry with its slots, said blades having like cutter elements and back bars provided with end portions of unequal length interlockingly engageable with the top plate and reversible, end for end, to stagger the cutter elements on successive blades.

7. In a machine of the described class, a cutter blade struck up from sheet metal in the form of a straight supporting back bar and cutter elements, each having one side marginal portion in a different plane from that occupied by the other side marginal portion, said back bar being adapted for assembly with like cutter blades in axially shifted positions, whereby the cutter elements of each blade may be staggered with reference to the elements of the associated blades.

8. In a machine of the described class, a cutter blade struck up from sheet metal in the form of a supporting back bar and cutter elements, each having one side marginal portion in a different plane from that occupied by the other side marginal portion, in combination with an assembly of spaced separable blades, arranged with their back bars parallel and the cutter elements of successive blades staggered with reference to those of the adjacent blades.

9. In a machine of the described class, a blade carrier having a top plate provided with a cup-shaped upper face, rollers carried by the side wall of the cup in combination with a support having an annular trackway upon which said rollers may travel and from which the top plate may be suspended to oscillate, and means for releasably clamping to the lower face of the top plate a set of parallel blades provided with cutter elements, the width of the set approximating the diameter of said trackway, and means for spacing the blades from each other.

10. In a machine of the described class, a blade carrier having a top plate provided with a cup-shaped upper face, in combination with a support from which the cup-shaped face may be suspended to oscillate, and means for releasably clamping to the lower face of the top plate a set of parallel blades provided with cutter elements, said cutter elements each comprising an elongated knife-like tooth with wing-like side margins offset from its central axis, and the blades being reversible on the carrier to face the teeth of successive blades in opposite directions and stagger them with reference to those of adjacent blades, substantially as described.

11. In a machine of the described class, the combination with a supporting ring provided with ring reciprocating means, a blade carrier mounted to oscillate upon the ring and provided with a dove-tailed blade receiving channel, a set of sheet metal blades each comprising a straight back bar adapted to be received in said channel and a set of depending cutter elements of a generally arcuate cross section, spacing and clamping bars for securing the back bars in said channel, and a clamping screw provided with a handle for oscillating the carrier and holding the bars and blades in binding relation to the carrier, with the cutter elements of successive blades in staggered relation to each other.

12. In a machine of the described class, the combination with a vertically movable support, of a mounting ring thereon provided with an outwardly facing channel, a blade carrier having an annular wall concentric with said channel, stud bolts extending through said wall and engageable in said channel, and stops for engaging the stud bolts to limit the oscillation of the carrier, the ring being provided with notches to release the stud bolts when one of the stops is removed and the carrier oscillated beyond its normal range of movement.

13. In a machine of the described class, the combination with a vertically movable support, of a mounting ring thereon provided with an outwardly facing channel, a blade carrier having an annular wall concentric with said channel, stud bolts extending through said wall and engageable in said channel, and stops for engaging the stud bolts to limit the oscillation of the carrier, the ring being provided with notches to release the stud bolts when one of the stops is removed and the carrier oscillated beyond its normal range of movement, said carrier being provided with a resiliently supported slotted stripper plate, a set of detachable blades adapted to be forced through the stripper plate slots, and a carrier oscillating handle, all removable as a unit from the mounting ring.

14. In a machine of the described class, a blade carrier provided with a top plate and a set of removable depending blades, a slotted stripper plate having pairs of posts extending through the top plate, and a spring for each pair of posts having a central coil, a post engaging hook at one end and a post engaging arm at the other end, looped to provide a handle to separate the sides of the loop for release of the post, the carrier having projections to receive the central coil of the spring, whereby to normally resiliently support the posts and stripper plate from the carrier, while permitting quick release therefrom by a spreading movement of the spring loops.

15. In a machine of the described class, the combination of a hollow column slotted in one side, a hollow arm mounted to slide upon the column, a fulcrum bar having its lower end pivoted within the column, a lever pivoted within the arm and fulcrumed to the upper end of the fulcrum bar, said lever extending through a slot in the arm, and a blade carrier mounted to oscillate upon the arm, said fulcrum bar being adapted to oscillate in the column slot when the lever is reciprocated to raise and lower the arm with reference to the column.

16. A machine for cross cutting steaks and the like for tenderizing purposes, comprising the combination of a column formed in telescoping sections, a laterally projecting housing connected with the upper section, a blade carrier having swivelled connection with the housing and releasable therefrom in one position of adjustment, a removable stop normally obstructing movement of the blade carrier to releasing position, an apertured stripper plate resiliently connected with the blade carrier, a set of spaced blades detachably connected with the carrier in positions for registry with the stripper plate apertures, and an operating arm for oscillating the carrier adapted to be rotatively adjusted to lock and release the blades with reference to the carrier.

17. In a machine for cross cutting steaks and other fibrous material, the combination with an oscillatory blade carrier, means for reciprocating the carrier and a carrier oscillating handle adapted, by rotation about its own axis, to clamp the blades to the carrier.

ARNO A. EWALD.